United States Patent
Matsuura (10) Patent No.: US 9,019,294 B2
(45) Date of Patent: Apr. 28, 2015

(54) COLOR PROCESSING APPARATUS AND METHOD THEREOF

(71) Applicant: Canon Kabushiki Kaisha, Tokyo (JP)

(72) Inventor: Takahiro Matsuura, Inagi (JP)

(73) Assignee: Canon Kabushiki Kaisha, Tokyo (JP)

(*) Notice: Subject to any disclaimer, the term of this patent is extended or adjusted under 35 U.S.C. 154(b) by 201 days.

(21) Appl. No.: 13/856,976

(22) Filed: Apr. 4, 2013

(65) Prior Publication Data

US 2013/0307864 A1 Nov. 21, 2013

(30) Foreign Application Priority Data

May 15, 2012 (JP) ................................ 2012-111828

(51) Int. Cl.
| | | |
|---|---|---|
| G09G 5/00 | (2006.01) | |
| G09G 5/02 | (2006.01) | |
| G09G 5/36 | (2006.01) | |
| G09G 5/10 | (2006.01) | |
| H04N 5/202 | (2006.01) | |
| H04N 5/46 | (2006.01) | |
| G03F 3/08 | (2006.01) | |
| G06K 9/54 | (2006.01) | |
| G06T 11/00 | (2006.01) | |
| H04N 1/60 | (2006.01) | |

(52) U.S. Cl.
CPC ............ *G06T 11/001* (2013.01); *H04N 1/6011* (2013.01)

(58) Field of Classification Search
USPC ......... 345/589–591, 600–602, 549, 204, 690, 345/1.1, 1.3; 348/179–180, 254, 557; 358/518–519, 523, 524; 382/162, 167, 382/245, 305
See application file for complete search history.

(56) References Cited

U.S. PATENT DOCUMENTS

| | | | |
|---|---|---|---|
| 6,823,090 B2 | 11/2004 | Matsuura | |
| 7,013,042 B1 | 3/2006 | Yamada et al. | |
| 7,245,776 B2 | 7/2007 | Matsuura | |
| 7,577,289 B2 | 8/2009 | Matsuura | |
| 7,697,781 B2 | 4/2010 | Matsuura | |
| 7,751,618 B2 | 7/2010 | Matsuura | |
| 7,983,479 B2 * | 7/2011 | Suzuki et al. ................. | 382/162 |
| 2008/0316513 A1* | 12/2008 | Yamazoe ....................... | 358/1.9 |
| 2009/0116082 A1 | 5/2009 | Osa et al. | |
| 2009/0154798 A1* | 6/2009 | Mizukura et al. ............ | 382/162 |
| 2010/0265524 A1* | 10/2010 | Muramatsu .................. | 358/1.9 |
| 2012/0218572 A1* | 8/2012 | Kishino et al. ................ | 358/1.9 |

FOREIGN PATENT DOCUMENTS

| | | |
|---|---|---|
| JP | 2009-117991 A | 5/2009 |
| JP | 2010-081326 A | 4/2010 |
| JP | 2010-166113 A | 7/2010 |

* cited by examiner

*Primary Examiner* — Wesner Sajous
(74) *Attorney, Agent, or Firm* — Fitzpatrick, Cella, Harper & Scinto (57) ABSTRACT

A first table, which expresses a color reproducible characteristic of a first output device, is generated, and a second table, which expresses a color reproducible characteristic of a second output device, is generated. Color values of grid points of the first table are mapped to a color gamut of the second output device expressed by the second table. A third table, which expresses a relationship between color values of the first table after mapping processing and device values required to reproduce colors of the color values by the second output device, is generated. With reference to the third table, a profile, which expresses a relationship between color values of grid points arranged on a uniform color space, and device values required to reproduce colors of the color values by the second output device, is generated.

13 Claims, 9 Drawing Sheets

COLOR PROCESSING APPARATUS AND METHOD THEREOF

BACKGROUND OF THE INVENTION

1. Field of the Invention

The present invention relates to color processing for generating a soft proofing profile.

2. Description of the Related Art

For color matching in color processing of a color image, conversion based on ICC (International Color Consortium) profiles is popularly used. Normally, two different profiles, that is, a source profile and destination profile are used. When an image for soft proofing is generated using conversion based on ICC profiles, image data on an sRGB space is converted onto that on a printer RGB space, and is then converted onto a display RGB space, that is, conversion is normally executed twice.

Japanese Patent Laid-Open No. 2010-166113 (literature 1) discloses a technique which implements soft proofing by color conversion which sequentially associates at least three different color conversion profiles, that is, an input profile, work profile, and output profile with each other.

Also, Japanese Patent Laid-Open No. 2010-081326 (literature 2) discloses a device link profile required to implement soft proofing that takes a viewing condition into consideration. That is, this literature discloses a device link profile required to convert device-dependent image data to be printed into device-independent image data, and to convert the device-independent image data into device-dependent image data which considers a viewing condition of a monitor.

Also, the influence of a viewing condition can be designated using a user interface (UI). For example, Japanese Patent Laid-Open No. 2009-117991 (literature 3) discloses a UI used to designate a degree of influence of causes of color differences between a print image and a soft proofing image in a viewing condition under which colors of the print image and soft proofing image are compared. Literature 3 executes color correction according to the designated degree of influence. Note that on the UI of literature 3, respective items of a light source type, proof paper type, monitor type, wall color, viewer's clothing color, light amount, monitor reflection, paper reflection, temperature, and humidity are enumerated as causes of color differences.

However, soft proofing which uses color conversion profiles independent from the viewing condition cannot support the viewing condition. Also, the device link profile limits applications that the profile can support. Also, the UI used to designate the degree of influence of causes of color differences increases the load on the user.

SUMMARY OF THE INVENTION

In one aspect, a color processing apparatus for generating a profile required to reproduce an image reproduced by a first output device using a second output device, the apparatus comprising: a first generation unit configured to generate a first table which expresses a color reproducible characteristic of the first output device and a second table which expresses a color reproducible characteristic of the second output device; a mapping unit configured to execute first mapping processing so as to map color values of grid points of the first table to a color gamut of the second output device expressed by the second table; a second generation unit configured to generate a third table which expresses a relationship between color values of the first table after the first mapping processing and device values required to reproduce colors of the color values by the second output device; and a third generation unit configured to generate the profile which expresses a relationship between color values of grid points arranged on a uniform color space and the device values required to reproduce colors of the color values by the second output device with reference to the third table.

According to the aspect, a proofing profile coupled with a color reproducible characteristic of an output device can be generated.

Further features of the present invention will become apparent from the following description of exemplary embodiments with reference to the attached drawings.

DESCRIPTION OF THE EMBODIMENTS

Color processing according to an embodiment of the present invention will be described in detail hereinafter with reference to the drawings.

First Embodiment

Arrangement of Apparatus

Figure 1:
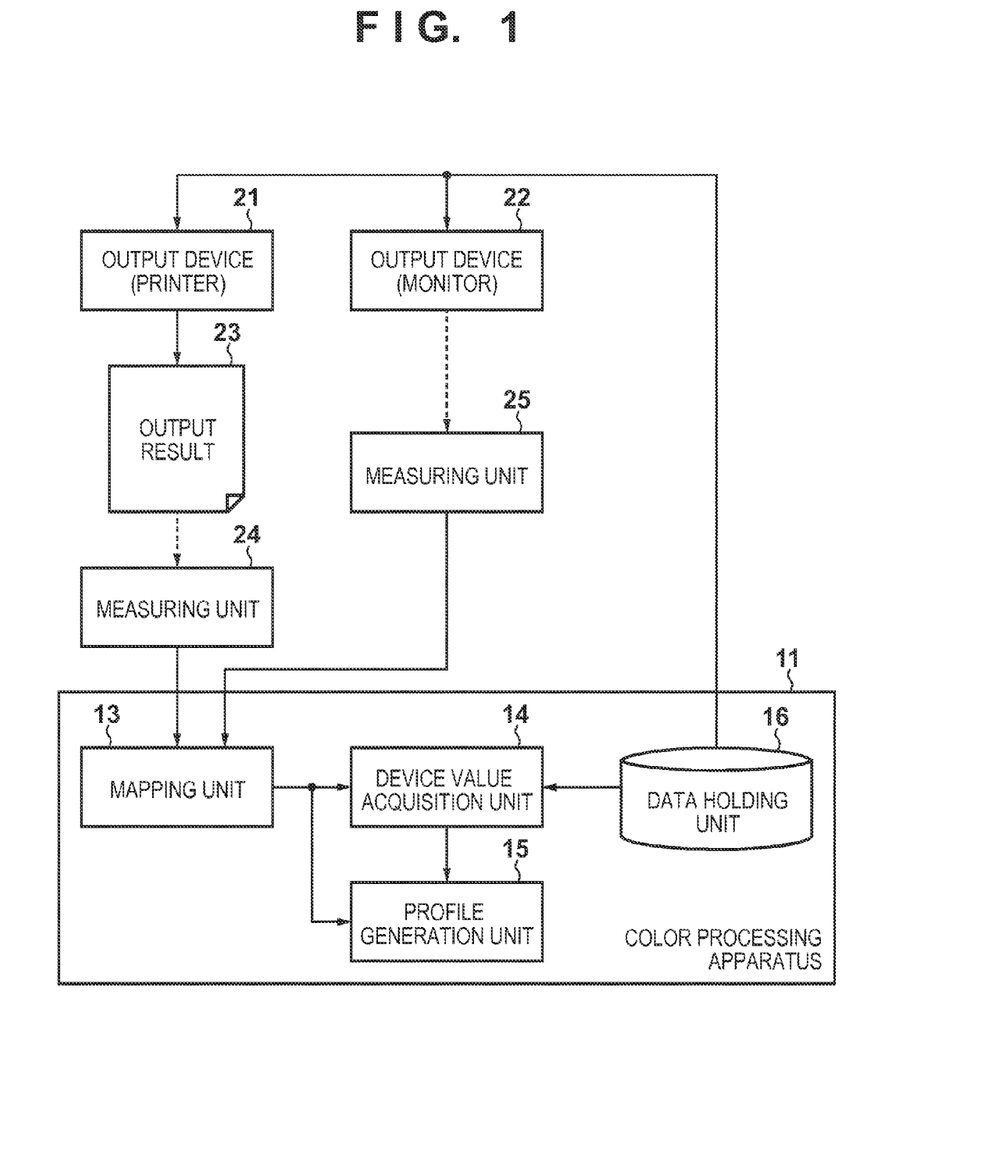
FIG. 1 is a block diagram for explaining the functional arrangement of a color processing apparatus, which generates a profile of an embodiment.

The functional arrangement of a color processing apparatus 11 used to generate a profile of an embodiment will be described below with reference to the block diagram shown in FIG. 1.

A data holding unit 16 of the color processing apparatus 11 holds data of grid points (coordinate values of the grid points) arranged on a predetermined color space. For example, when an output device inputs R, G, and B 8-bit data, the data holding unit 16 holds R, G, and B data obtained by dividing data from (R, G, B)=(0, 0, 0) to (R, G, B)=(255, 255, 255) for every 16 steps per color. That is, the data holding unit 16 holds data of (R, G, B)=(0, 0, 0), (0, 0, 16), (0, 0, 32), . . . , (255, 255, 255), that is, a total of 4913 (=$17^3$) R, G, and B data. Image data as combinations of data held by the data holding unit 16 are supplied to output devices 21 and 22 so as to measure a color reproducible characteristic, and are reproduced as a color chart having a plurality of color patches by the output devices 21 and 22. Data corresponding to each color patch can be discriminated from its position on the color chart.

Measuring units 24 and 25 are respectively contact and non-contact type measuring devices. The measuring unit 24 measures an output result (printed matter) 23 of the output device 21 to measure the color reproducible characteristic of the output device 21. The measuring unit 25 measures the color reproducible characteristic of the output device 22. Note that a single measuring device may be used in turn as the measuring units 24 and 25. For example, the output device 21 is a printer, and the output device 22 is a monitor. In the following description, the output devices 21 and 22 will be described as the printer 21 and monitor 22, but the present invention is not limited to such specific combination.

A mapping unit 13 inputs measurement results of the measuring units 24 and 25, and compares the color reproducible characteristics of the printer 21 and monitor 22. Then, the mapping unit 13 maps a color gamut which falls within a color reproduction range of the printer 21 but falls outside that of the monitor 22 (to be referred to as "non-reproducible color range of the monitor" hereinafter) in the color reproduction range of the monitor 22, thereby forming a color gamut of the printer 21 after first mapping processing. Note that the non-reproducible color range of the monitor includes, for example, a color gamut corresponding to high-saturation, low-lightness green.

A device value acquisition unit 14 acquires device values of the monitor 22 required to reproduce, by the monitor 22, colors in the color reproduction range of the printer 21 after the first mapping processing. A profile generation unit 15 generates a profile from the processing results of the mapping unit 13 and device value acquisition unit 14 using second mapping processing.

Note that the color processing apparatus 11 need not include the data holding unit 16, and the data held by another apparatus (a server or storage device on a network) may be supplied to the output devices 21 and 22.

[Profile Generation Processing]

Figure 2:
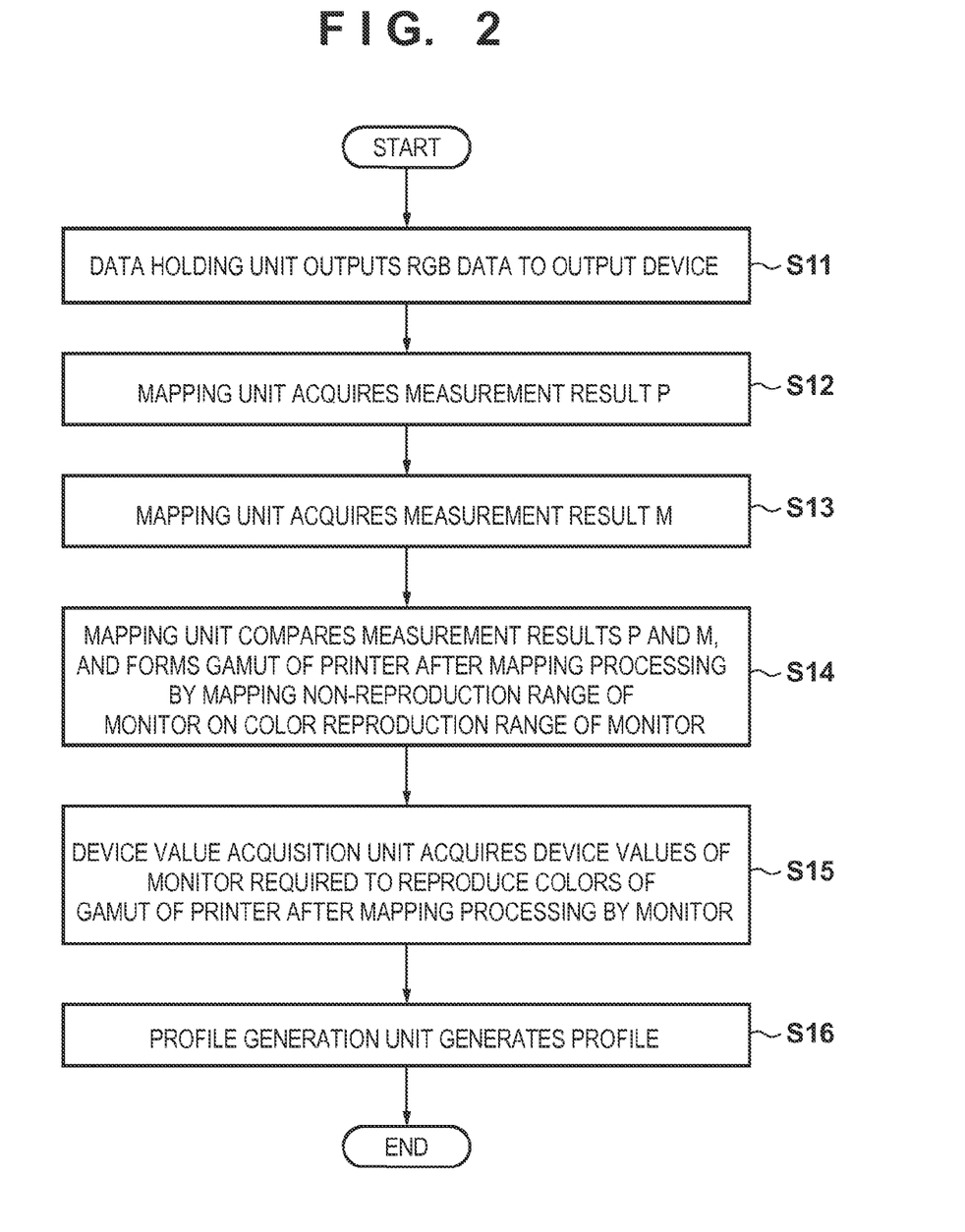
FIG. 2 is a flowchart for explaining profile generation processing.

Profile generation processing will be described below with reference to the flowchart shown in FIG. 2.

The data holding unit 16 outputs the held RGB data to the printer 21 and monitor 22 (step S11). The monitor 22 to which the R, G, and B data are input displays color patches corresponding to the respective RGB data, and the printer 21 to which the RGB data are input outputs an output result 23 obtained by forming color patches corresponding to the respective RGB data on a printing sheet.

The mapping unit 13 acquires a measurement result of the measuring unit 24 (to be referred to as "measurement result P" hereinafter) (step S12), and also acquires a measurement result of the measuring unit 25 (to be referred to as "measurement result M" hereinafter) (step S13). Note that the measurement results P and M indicate values on a visually uniform color space, for example, color values on a CIELab space of the respective color patches.

Next, as will be described in detail later, the mapping unit 13 compares the measurement results P and M, and forms a gamut of the printer 21 after mapping processing by mapping a non-reproducible color range of the monitor included in the color reproduction range of the printer in the color reproduction range of the monitor 22 (step S14).

Next, as will be described in detail later, the device value acquisition unit 14 acquires device values of the monitor 22 required to reproduce, by the monitor 22, colors of the gamut of the printer 21 after the mapping processing (step S15). Then, as will be described in detail later, the profile generation unit 15 generates a profile from the processing results of the mapping unit 13 and device value acquisition unit (step S16).

Mapping

Figure 3:
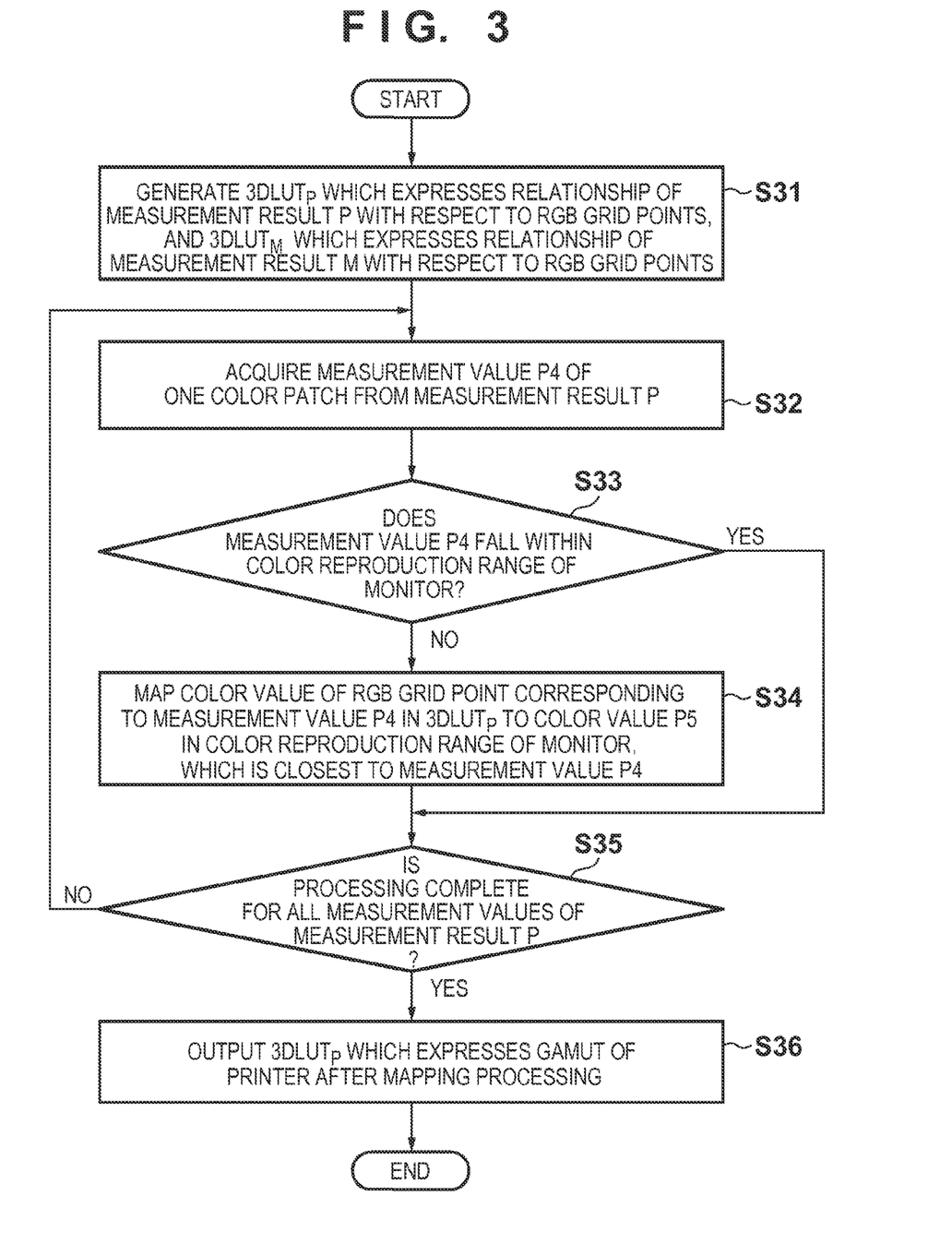
FIG. 3 is a flowchart for explaining mapping processing.

The mapping processing (step S14) will be described below with reference to the flowchart shown in FIG. 3.

The mapping unit 13 generates three-dimensional lookup tables (3DLUTs) which express the relationships of the measurement results (color values) with respect to RGB grid points (RGB data) (step S31). That is, the mapping unit 13 generates a $3DLUT_P$ as a first table which expresses the correspondence relationship between the RGB grid points and the measurement result P, and a $3DLUT_M$ as a second table which expresses the correspondence relationship between the RGB grid points and the measurement result M. These $3DLUT_S$ express the output device color reproduction range.

The mapping unit 13 acquires a measurement value of one color patch from the measurement result P (step S32), and determines with reference to the $3DLUT_M$ whether or not the acquired measurement value falls within the color reproduction range of the monitor 22 (step S33). This determination is made as follows.

Initially, triangles located on outermost surfaces of the $3DLUT_M$ are acquired one by one. The triangle located on the outermost surface is a triangle having, as vertices, grid points at each of which at least one component of RGB values is zero or maximum value (0 or 255 in case of 8 bits). Note that let P1, P2, and P3 be color values corresponding to RGB values of the three vertices.

Then, letting P0 be a color value of a certain grid point in the $3DLUT_M$ (other than the outermost surface), and P4 be the acquired measurement value, if equation (1) holds, the measurement value P4 is located outside the triangle of the outermost surface.

$$\vec{p4} = \kappa \vec{p1} + \lambda \vec{p2} + \mu \vec{p3}$$

$$\kappa + \lambda + \mu > 1 \quad (1)$$

where $\vec{p1}$, $\vec{p2}$, $\vec{p3}$, and $\vec{p4}$ are vectors which respectively connect P0 and P1, P2, P3, and P4, and $\kappa$, $\lambda$, and $\mu$ are linear coupling coefficients.

The mapping unit 13 determines equation (1) for all triangles on the outermost surfaces of the $3DLUT_M$. If one triangle which satisfies equation (1) is found, the mapping unit 13 determines that the measurement value P4 falls outside the color reproduction range of the monitor 22. If no triangle which satisfies equation (1) is found, the mapping unit 13 determines that the measurement value P4 falls within the color reproduction range of the monitor 22.

If the measurement value P4 falls outside the color reproduction range of the monitor 22, the mapping unit 13 maps a color value of an RGB grid point corresponding to the measurement value P4 in the $3DLUT_P$ to a color value which is closest to the measurement value P4 and falls within the color reproduction range of the monitor 22 (step S34).

Let drop a normal from the measurement value P4 to a plane including the color values of the vertices of the triangle located on the outermost surface. If an intersection between the normal and plane falls within a region bounded by the color values of the three vertices (to be referred to as "within the triangle" hereinafter), a color value of the intersection is that of a mapping destination. If equation (2) is satisfied, it is determined that the intersection of the normal falls within the triangle.

$$\vec{q1}2 \times \vec{q1}3 = \kappa \vec{p4}1 + \lambda \vec{p4}2 + \mu \vec{p4}3$$

$$\kappa, \lambda, \mu > 0 \text{ or } \kappa, \lambda, \mu < 0$$

where $\vec{q1}2$ is a vector which connects P1 and P2, $\vec{q1}3$ is a vector which connects P1 and P3, $\vec{p4}1$, $\vec{p4}2$, and $\vec{p4}3$ are vectors which respectively connect P4 and P1, P2, and P3, and "×" is an outer product of the vectors.

If the intersection of the normal falls within the triangle, the mapping unit 13 calculates a color value P5 of the intersection by:

$$P5=P4+(\kappa p\vec{4}1+\lambda p\vec{4}2+\mu p\vec{4}3)/(\kappa+\lambda+\mu) \quad (5)$$

Then, the mapping unit 13 sets the color value P5 as a mapping destination.

If the intersection of the normal falls outside the triangle, the mapping unit 13 sets a color value P5 of a vertex or, for example, a middle point of a side, which has the shortest distance from the measurement value P4, as a mapping destination. Note that the mapping unit 13 makes the aforementioned determination and calculation for all the triangles located on the outermost surfaces, and sets the color value P5 having the shortest distance from the measurement value P4 as the mapping destination.

Next, the mapping unit 13 determines whether or not the processes of steps S32 to S34 are complete for all measurement values of the measurement result P (step S35). If measurement values to be processed still remain, the process returns to step S32. If the processes of steps S32 to S34 are complete for all the measurement values of the measurement result P, the mapping unit 13 outputs the $3DLUT_P$ which expresses the gamut of the printer 21 after the mapping processing (step S36).

Note that the example in which the measurement value P4 is mapped to the closest point in the color reproduction range of the monitor 22 has been described above. For example, the measurement value P4 may be mapped to the closest point while maintaining a hue or saturation value of the measurement value P4. Furthermore, in order to maintain tonality, the gamut of the printer 21 outside the non-reproduction range of the monitor may also be mapped.

Acquisition of Device Value

Figure 4:
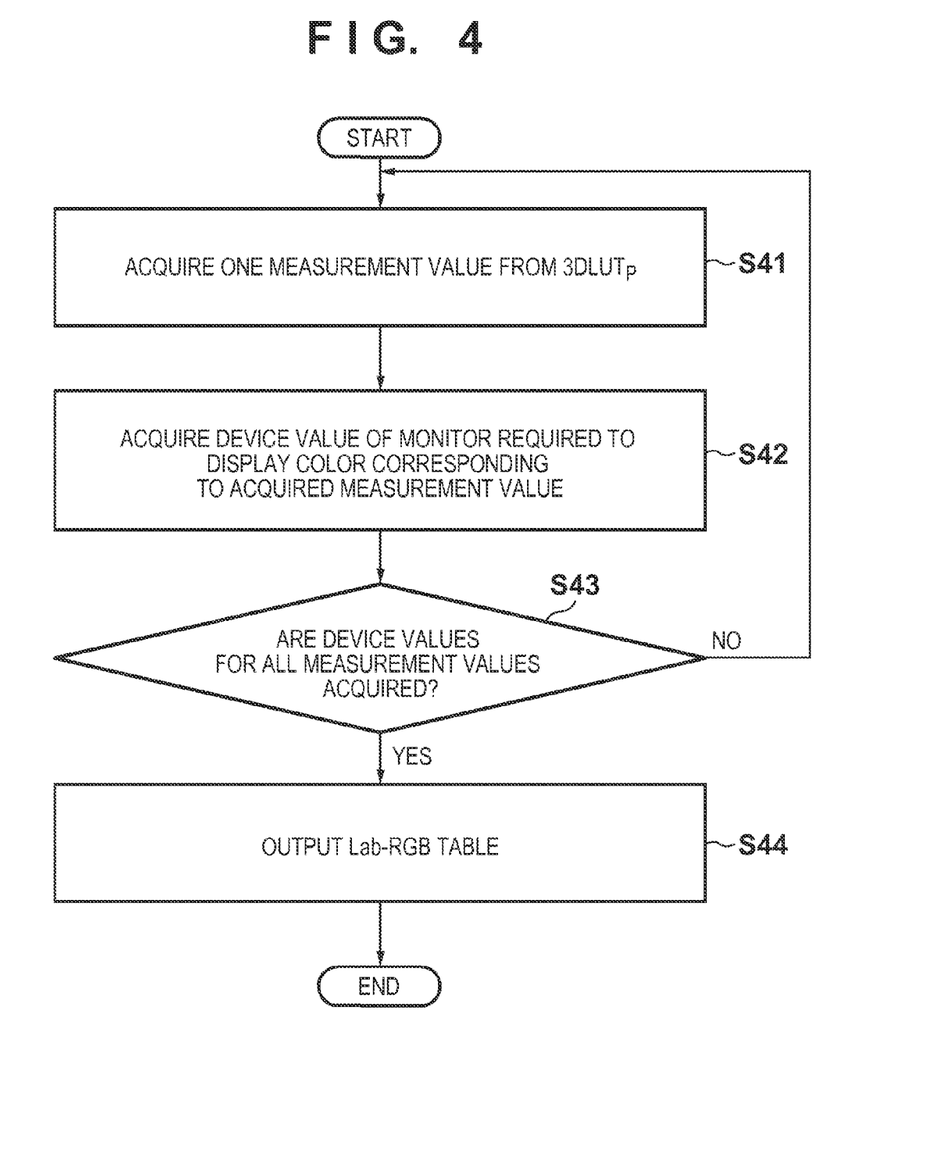
FIG. 4 is a flowchart for explaining acquisition of device values.

The acquisition of device values (step S15) will be described below with reference to the flowchart shown in FIG. 4.

The device value acquisition unit 14 acquires one measurement value from the $3DLUT_P$ which expresses the gamut of the printer 21 after the mapping processing (step S41), and acquires a device value (RGB value) of the monitor 22 required to display a color corresponding to the acquired measurement value (step S42). In order to acquire a device value, for example, the $3DLUT_M$ (supplied from the mapping unit 13) which expresses the color reproduction range of the monitor 22 and tetrahedral interpolation or cubic interpolation are used.

Next, the device value acquisition unit 14 determines whether or not device values of the monitor 22 have been acquired for all measurement values of the $3DLUT_P$ (step S43). If measurement values for which device values are to be acquired still remain, the process returns to step S41. If device values of the monitor 22 have been acquired for all the measurement values of the $3DLUT_P$, the device value acquisition unit 14 outputs the device values of the monitor 22, which reproduce the gamut of the printer 21 after the mapping processing, to the profile generation unit 15 (step S44). Note that the data output from the device value acquisition unit 14 are those in a table format which describes the device values (RGB values) corresponding to the measurement values (Lab values) (to be referred to as an Lab-RGB table hereinafter).

Note that the device values may be calculated using a masking matrix which models the color reproduction range of the monitor 22. That is, let Lab be a color value of an arbitrary point of the color reproduction range of the monitor 22, and RGB be a device value. Then, M1 (3×4 matrix) which satisfies:

$$\begin{bmatrix} R \\ G \\ B \end{bmatrix} = M1 \begin{bmatrix} L \\ a \\ b \\ 1 \end{bmatrix} \quad (4)$$

or M2 (3×10 matrix) which satisfies:

$$\begin{bmatrix} R \\ G \\ B \end{bmatrix} = M2 \begin{bmatrix} L \\ a \\ b \\ LL \\ La \\ Lb \\ aa \\ ab \\ bb \\ 1 \end{bmatrix} \quad (5)$$

is decided using a least square method or DLS (Dumped Least Square) method. Then, by inputting a measurement value (Lab value) of each grid point of the $3DLUT_P$ to equation (4) or (5), a corresponding device value (RGB value) can be obtained.

Generation of Profile

Figure 5:
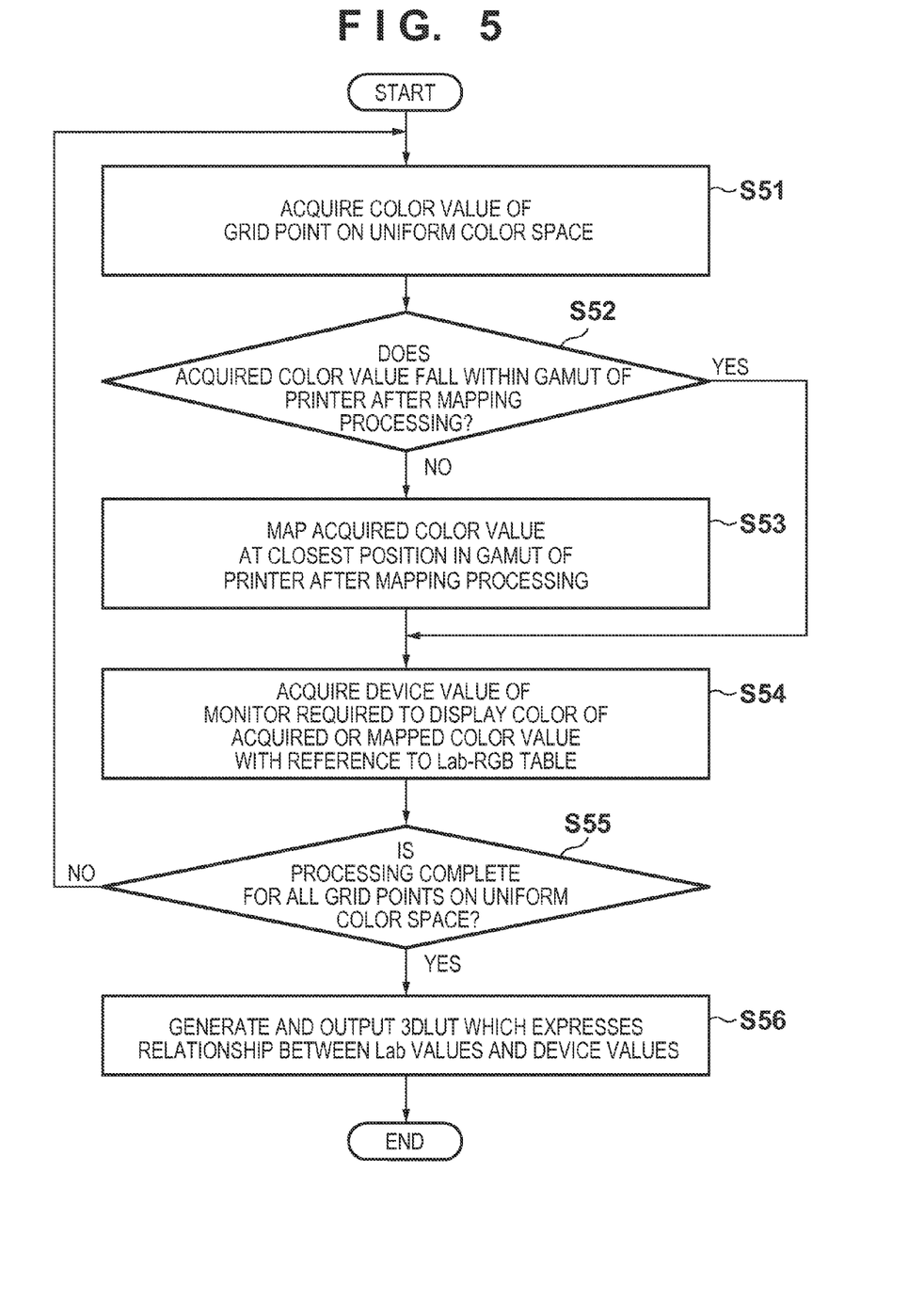
FIG. 5 is a flowchart for explaining generation of a profile.

Generation of a profile (step S16) will be described below with reference to the flowchart shown in FIG. 5. In this case, a generation example of a 3DLUT corresponding to an ICC profile will be explained.

The profile generation unit 15 acquires a color value of a grid point arranged on a uniform color space (step S51). If a CIELab space is used as the uniform color space, color values (L, a, b) are expressed by a range from (0, −128, −128) to (100, 128, 128). Therefore, grid points need only be arranged to include lightness values L at 6.25 steps and chromaticity values a and b at 16 steps. In this case, a total of $17^3=4913$ grid points, that is, (L, a, b)=(0, −128, −128), (0, −128, −112), . . . , (0, 128, 128), (6.25, −128, −128), . . . , (100, 128, 128) are arranged.

Next, the profile generation unit 15 determines whether or not the acquired color value falls within the gamut of the printer 21 after the mapping processing indicated by the $3DLUT_P$ (step S52). If the color value falls outside the gamut, the profile generation unit 15 maps the acquired color value at a closest position within the gamut of the printer 21 after the mapping processing (step S53). This mapping can be done by the same method as in step S34, and a detailed description thereof will not be repeated.

Next, the profile generation unit 15 acquires a device value of the monitor 22 required to display a color of the acquired or mapped color value with reference to the Lab-RGB table as a third table generated by the device value acquisition unit 14 (step S54). Note that this device value can be acquired by the same method as in step S42, and a detailed description thereof will not be repeated.

Next, the profile generation unit 15 determines whether or not the processes of steps S52 to S54 are complete for all the grid points (for example, the above 4913 points) on the uniform color space (step S55). If grid points to be processed still remain, the process returns to step S51. If the processes of steps S52 to S54 are complete for all the grid points, the profile generation unit 15 generates a 3DLUT as a fourth table which expresses the relationship between Lab values and device values, and outputs that 3DLUT as an ICC profile (step S56).

[Profile Conversion]

Profile conversion will be described below with reference to FIG. 6.

Figure 6:
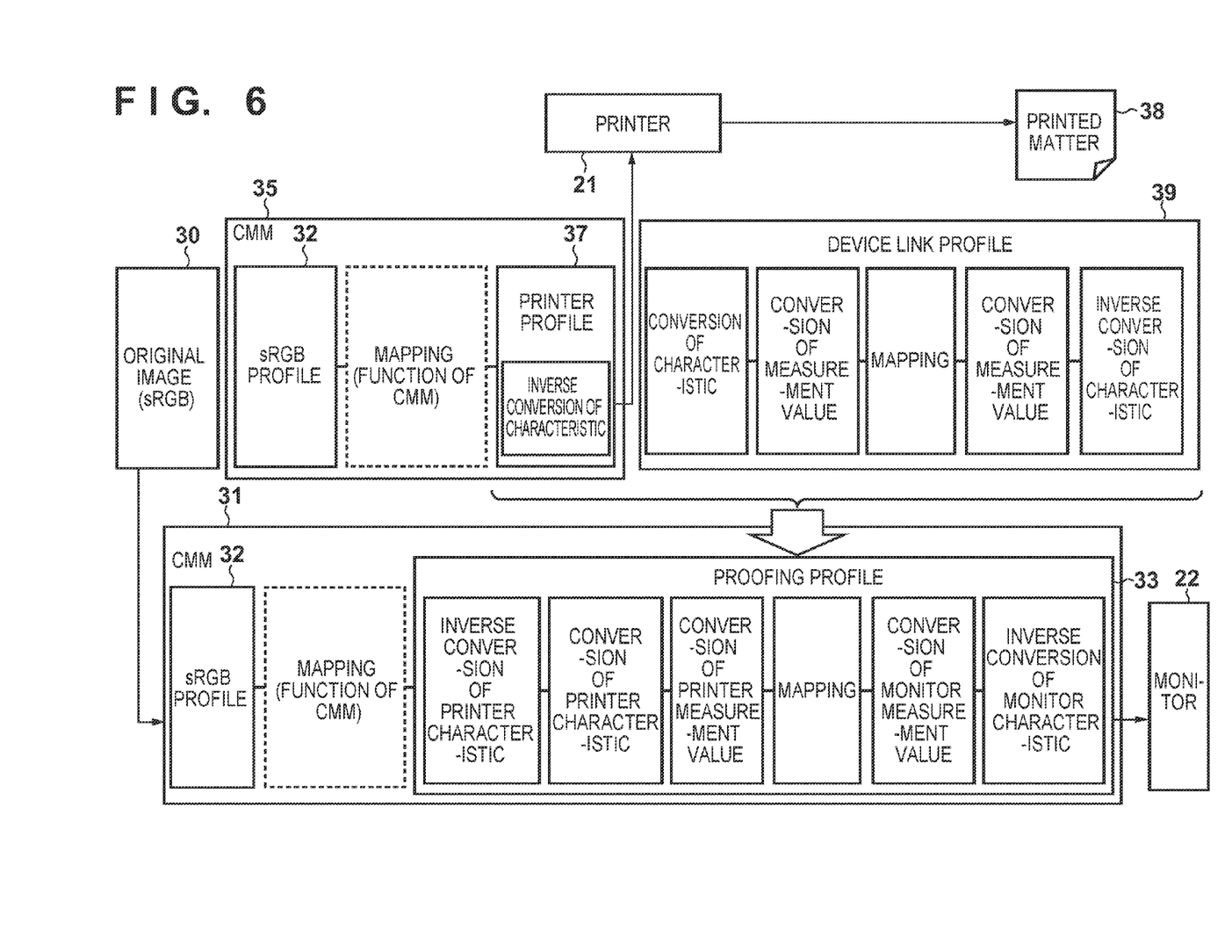
FIG. 6 is a view for explaining profile conversion.

As shown in FIG. 6, the profile as the fourth table generated by the profile generation unit 15 is a device link profile 39 for the monitor 22, which is coupled with the color reproducible characteristic of the printer 21. For example, an sRGB profile 32 is applied as a source profile to a color matching module (CMM) 31 of the monitor 22 side. Furthermore, a proofing profile 33 which incorporates a device link profile 39 and printer profile 37 is applied as a destination profile. Then, when sRGB data of an image 30 are input to the monitor 22, a high-precision soft proofing image of the printer 21 can be displayed on the monitor 22.

Note that the soft proofing image corresponds to an image expressed by a printed matter 38, which is obtained by inputting sRGB data of the image 30 to the printer 21, by applying the sRGB profile 32 as a source profile to the CMM 35 on the printer 21 side, and further applying the printer profile 37 as a destination profile.

[Designation Example Using UI in Application]

Figure 7:
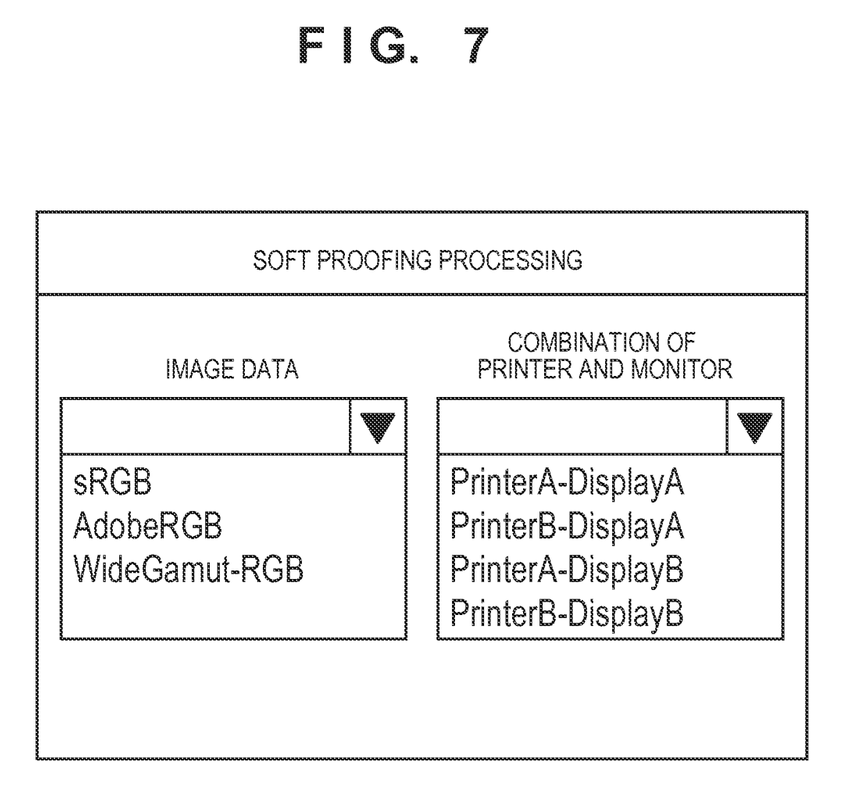
FIG. 7 is a view for explaining an example of a UI used upon execution of profile conversion by an application.

An example of a UI upon execution of profile conversion in an application will be described below with reference to FIG. 7.

The profile generated as described above is that coupled with the characteristics of the printer 21 and monitor 22. Therefore, upon execution of profile conversion, the application displays a selection box which allows the user to select a combination of a profile and monitor on a UI. Also, a selection box used to select a type of image data is used to set a source profile.

In this manner, a proofing profile in the ICC format coupled with the color reproducible characteristics of the output devices is generated, and precise soft proofing can be implemented by profile conversion using the source and destination profiles in the ICC format.

Second Embodiment

Color processing according to the second embodiment of the present invention will be described below. Note that in the second embodiment, the same reference numerals denote the same components as those in the first embodiment, and a detailed description thereof will not be repeated.

[Arrangement of Apparatus]

Figure 8:
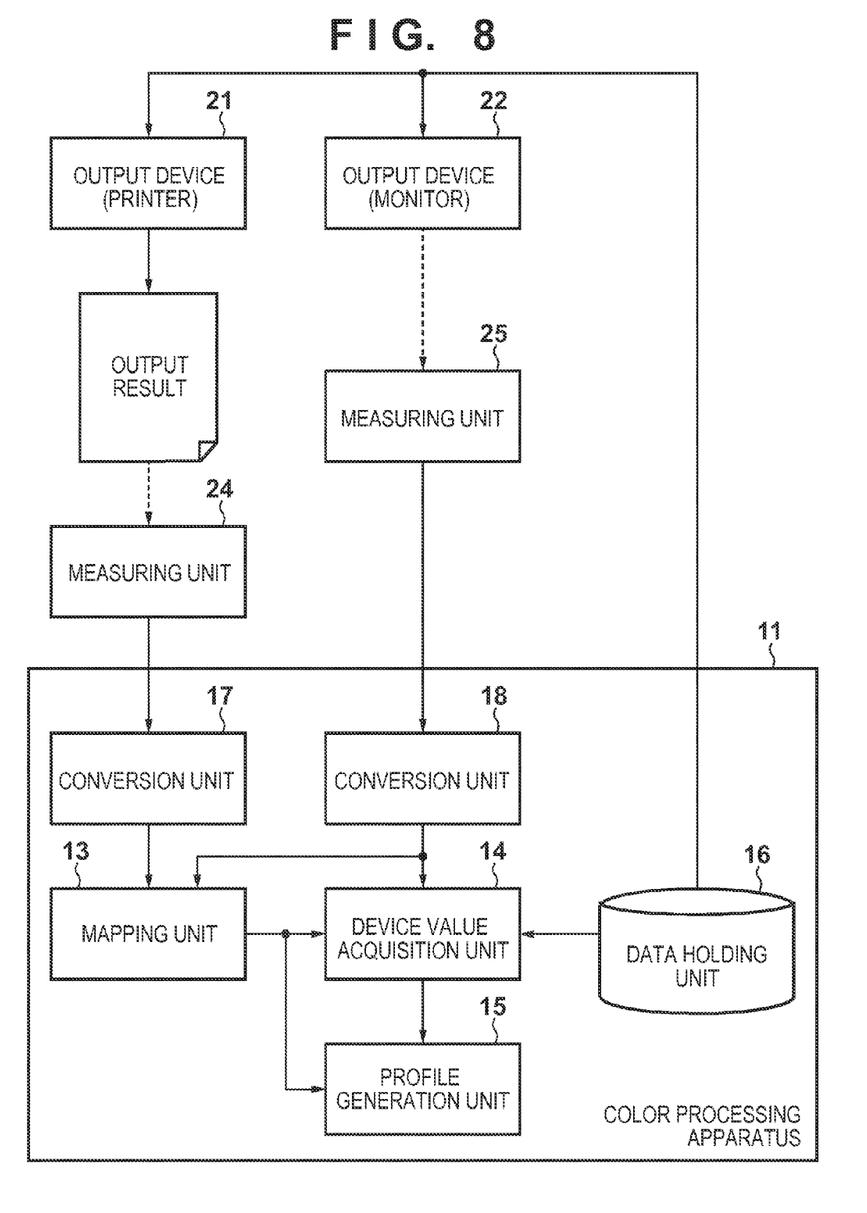
FIG. 8 is a block diagram for explaining the functional arrangement of a color processing apparatus, which generates a profile of the second embodiment.

The functional arrangement of a color processing apparatus 11 which generates a profile according to the second embodiment will be described below with reference to the block diagram shown in FIG. 8.

The color processing apparatus of the second embodiment includes a conversion unit 17 connected between a measuring unit 24 and mapping unit 13, and a conversion unit 18 connected between a measuring unit 25, the mapping unit 13, and a device value acquisition unit 14 in addition to the functional arrangement of the color processing apparatus of the first embodiment.

The conversion units 17 and 18 convert measurement data output from the measuring units 24 and 25 into other measurement data. For example, a measurement value of a contact colorimeter which allows easy measurement is converted into that of a non-contact colorimeter which allows precise measurement.

[Profile Generation Processing]

Figure 9:
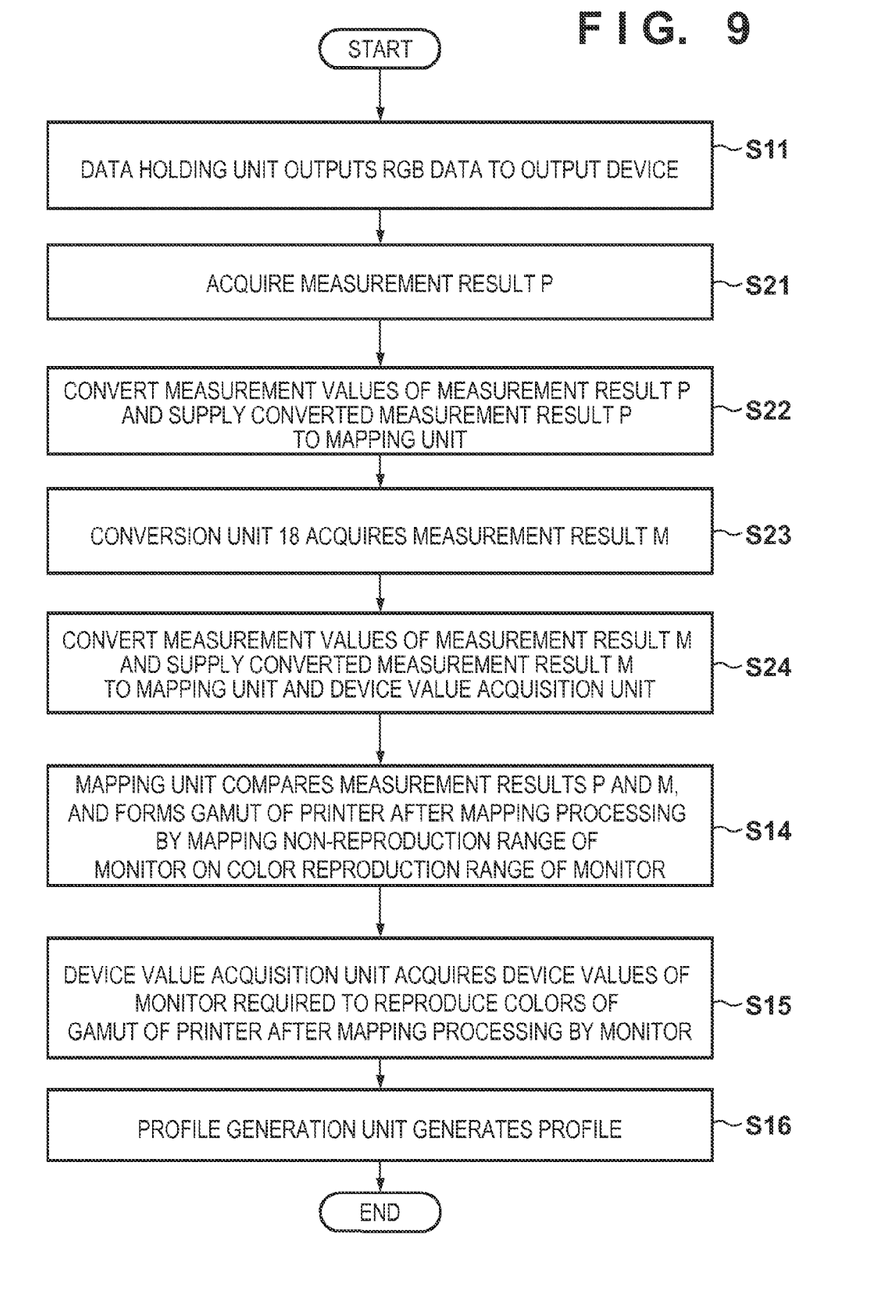
FIG. 9 is a flowchart for explaining profile generation processing according to the second embodiment.

An example of profile generation processing according to the second embodiment will be described below with reference to the flowchart shown in FIG. 9. Note that step S11 and S14 to S16 are roughly the same as the processes of the first embodiment, and a detailed description thereof will not be repeated.

In the second embodiment, the conversion unit 17 acquires a measurement result P which indicates a color reproducible characteristic of a printer 21 (step S21), and converts measurement values of the measurement result P (step S22). The converted measurement result P is input to the mapping unit 13. Also, the conversion unit 18 acquires a measurement result M indicating a color reproducible characteristic of a monitor 22 (step S23), and converts measurement values of the measurement result M (step S24). The converted measurement result M is input to the mapping unit 13 and device value acquisition unit 14.

Note that details of conversion will be described later. Also, the conversion units 17 and 18 may generate a $3DLUT_P$ and $3DLUT_M$ in the second embodiment after the measurement values are converted.

Conversion of Measurement Result

In general, colorimeters roughly include two types. The first colorimeter is a contact colorimeter which measures a color characteristic of a device in a state in which it nearly contacts an object to be measured, and the second colorimeter is a non-contact colorimeter which measures a color characteristic of a device in a state it is separated from an object to be measured. The contact colorimeter can attain easy measurement, and can measure a large number of colors within a short period of time. On the other hand, the non-contact colorimeter allows measurement under the same viewing condition as that when one views a printed matter or monitor in practice, and can obtain measurement values as close as one looks.

That is, when a measurement value of the contact colorimeter is converted into that of the non-contact colorimeter, a precise measurement value can be obtained within a short period of time. More specifically, under a desired viewing condition, a single object to be measured (a printed matter or monitor screen) is measured by the contact colorimeter and non-contact colorimeter, and a contact-to-non-contact conversion matrix is generated based on the correspondence relationship between their measurement values using a least square method or DLS method. Then, the generated conversion matrix is applied to the conversion units 17 and 18, thereby converting the measurement results.

In this manner, even when contact colorimeters which allow easy and quick measurement are used as the measuring units 24 and 25, a profile which has precision as high as that measured by the non-contact colorimeter which allows precise measurement is generated, thus implementing soft proofing that considers the viewing condition.

Modification of Embodiments

The above embodiments have exemplified the case in which a printer is used as the first output device 21, and a monitor is used as the second output device 22. However, a monitor can be used as the first output device 21, and a printer can be used as the second output device 22. In this case, a printed matter which represents an image close to that displayed on the monitor as a target can be obtained.

Alternatively, both the first and second output devices 21 and 22 may be monitors. In this case, an image close to that displayed on the target monitor can be displayed on the proofing monitor. Alternatively, the present invention is applicable to color matching among monitors when a plurality of monitors may be juxtaposed to be used as a single large-screen monitor.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-111828 filed May 15, 2012 which is hereby incorporated by reference herein in its entirety.

What is claimed is:

1. A color processing apparatus for generating a profile required to reproduce an image reproduced by a first output device using a second output device, the apparatus comprising:
a first generation unit configured to generate a first table which expresses a color reproducible characteristic of the first output device and a second table which expresses a color reproducible characteristic of the second output device;
a mapping unit configured to execute first mapping processing so as to map color values of grid points of the first table to a color gamut of the second output device expressed by the second table;
a second generation unit configured to generate a third table which expresses a relationship between color values of the first table after the first mapping processing and device values required to reproduce colors of the color values by the second output device; and
a third generation unit configured to generate the profile which expresses a relationship between color values of grid points arranged on a uniform color space and the device values required to reproduce colors of the color values by the second output device with reference to the third table.

2. The apparatus according to claim 1, wherein the first generation unit generates the first table from a relationship between measurement results of colors reproduced by the first output device based on data corresponding to a plurality of grid points arranged on a predetermined color space, and the plurality of grid points, and generates the second table from a relationship between measurement results of colors reproduced by the second output device based on the data, and the plurality of grid points.

3. The apparatus according to claim 1, wherein the mapping unit determines whether or not measurement values included in the first table are included in the color gamut of the second output device, and performs the first mapping processing to map color values of grid points of the first table, which correspond to measurement values that are not included in the color gamut of the second output device, to the color gamut of the second output device.

4. The apparatus according to claim 1, wherein the third generation unit generates the profile which expresses a relationship between color values obtained by mapping the color values of the grid points arranged on the uniform color space on a mapped gamut expressed by the first table after the first mapping processing, and device values required to reproduce colors of the color values by the second output device.

5. The apparatus according to claim 4, wherein the third generation unit determines whether or not the color values of the grid points on the uniform color space are included in the mapped gamut, and performs second mapping process to map color values of grid points on the uniform color space, which correspond to color values that are not included in the mapped gamut, to the mapped gamut.

6. The apparatus according to claim 1, further comprising an input unit configured to input the measurement results from a measuring device.

7. The apparatus according to claim 6, wherein the input unit converts measurement values input from a contact measuring device into measurement values of a non-contact measuring device.

8. The apparatus according to claim 1, further comprising a supply unit configured to supply the data to the first output device and the second output device.

9. The apparatus according to claim 1, wherein the first output device is a printer, and the second output device is a monitor.

10. The apparatus according to claim 1, wherein the first output device is a monitor, and the second output device is a printer.

11. The apparatus according to claim 1, wherein the first output device and the second output device are monitors.

12. A color processing method of generating a profile required to reproduce an image reproduced by a first output device using a second output device, the method comprising the steps of:
generating a first table which expresses a color reproducible characteristic of the first output device and a second table which expresses a color reproducible characteristic of the second output device;
executing first mapping processing so as to map color values of grid points of the first table to a color gamut of the second output device expressed by the second table;
generating a third table which expresses a relationship between color values of the first table after the first mapping processing and device values required to reproduce colors of the color values by the second output device; and
generating the profile which expresses a relationship between color values of grid points arranged on a uniform color space and the device values required to reproduce colors of the color values by the second output device with reference to the third table.

13. A non-transitory computer readable medium storing a computer-executable program for causing a computer to perform the color processing method according to claim 12.

* * * * *